(12) United States Patent
Takase et al.

(10) Patent No.: US 7,809,890 B2
(45) Date of Patent: Oct. 5, 2010

(54) SYSTEMS AND METHODS FOR INCREASING YIELD OF DEVICES HAVING CACHE MEMORIES BY INHIBITING USE OF DEFECTIVE CACHE ENTRIES

(75) Inventors: Satoru Takase, Round Rock, TX (US); Yasuhiko Kurosawa, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 250 days.

(21) Appl. No.: 11/175,504

(22) Filed: Jul. 6, 2005

(65) Prior Publication Data

US 2007/0011406 A1 Jan. 11, 2007

(51) Int. Cl.
G06F 13/00 (2006.01)
G06F 13/28 (2006.01)

(52) U.S. Cl. .......... 711/128; 711/152; 711/163; 711/E12.029

(58) Field of Classification Search .......... None
See application file for complete search history.

(56) References Cited

U.S. PATENT DOCUMENTS

| | | | | |
|---|---|---|---|---|
| 4,162,541 A * | 7/1979 | Hartke | ........... | 365/189.08 |
| 5,070,502 A * | 12/1991 | Supnik | ........... | 714/8 |
| 5,551,004 A | 8/1996 | McClure | | |
| 5,708,789 A | 1/1998 | McClure | | |
| 5,737,753 A | 4/1998 | Tsuchiya et al. | | |
| 6,418,515 B1 | 7/2002 | Kurosawa | | |
| 7,114,035 B2 * | 9/2006 | Day et al. | ........... | 711/133 |
| 2006/0179235 A1 * | 8/2006 | Bell et al. | ........... | 711/136 |

FOREIGN PATENT DOCUMENTS

| | | |
|---|---|---|
| JP | 59-94283 | 5/1984 |
| JP | 6-67980 | 3/1994 |
| JP | 8-50402 | 4/1996 |

OTHER PUBLICATIONS

J Hennessy et. al, "Computer Architecture: A Quantitative Approach", Third Edition, pp. 398-401, Pub. 2003.
David Culler et. al, "Parallell Computer Architecture: A Hardware/Software Approach", pp. 394-397, Pub. 1999.
Nanya, T., Fault Tolerant Computer, p. 155, Copyright 1991.
The Asynchronous 24MB On-Chip Level-3 Cache for a Dual-Core Itanium Family Processor, Wuu et al., Feb. 9, 2005.

* cited by examiner

*Primary Examiner*—Kevin Verbrugge
*Assistant Examiner*—Eric S Cardwell
(74) *Attorney, Agent, or Firm*—Law Offices of Mark L. Berrier (57) ABSTRACT

Systems and methods for increasing the yield of devices incorporating set-associative cache memories by selectively avoiding the use of cache entries that include defects. In one embodiment, a cache replacement manager determines in which of n possible entries data will be replaced. The cache replacement manager is configured to take into account whether each cache entry is defective when determining whether to select that entry as the destination entry for new data. The cache manager unit may implement a least-recently-used policy in selecting the cache entry in which the new data will be replaced. The cache replacement manager then treats any defective entries as if they hold the most recently used data, and thereby avoids selecting defective entries as the destination for new data. In one embodiment, the cache performs index translation before indexing into each set of cache entries in order to effectively redistribute defective entries among the indices.

6 Claims, 9 Drawing Sheets

Fig. 8A — no translation

| in(dec) | A3 | A2 | A1 | A0 | out(dec) |
|---|---|---|---|---|---|
| 0 | 0 | 0 | 0 | 0 | 0 |
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 0 | 0 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | 8 |
| 9 | 1 | 0 | 0 | 1 | 9 |
| 10 | 1 | 0 | 1 | 0 | 10 |
| 11 | 1 | 0 | 1 | 1 | 11 |
| 12 | 1 | 1 | 0 | 0 | 12 |
| 13 | 1 | 1 | 0 | 1 | 13 |
| 14 | 1 | 1 | 1 | 0 | 14 |
| 15 | 1 | 1 | 1 | 1 | 15 |

Fig. 8B — A3 inverted

| in(dec) | A3 | A2 | A1 | A0 | out(dec) |
|---|---|---|---|---|---|
| 0 | 1 | 0 | 0 | 0 | 8 |
| 1 | 1 | 0 | 0 | 1 | 9 |
| 2 | 1 | 0 | 1 | 0 | 10 |
| 3 | 1 | 0 | 1 | 1 | 11 |
| 4 | 1 | 1 | 0 | 0 | 12 |
| 5 | 1 | 1 | 0 | 1 | 13 |
| 6 | 1 | 1 | 1 | 0 | 14 |
| 7 | 1 | 1 | 1 | 1 | 15 |
| 8 | 0 | 0 | 0 | 0 | 0 |
| 9 | 0 | 0 | 0 | 1 | 1 |
| 10 | 0 | 0 | 1 | 0 | 2 |
| 11 | 0 | 0 | 1 | 1 | 3 |
| 12 | 0 | 1 | 0 | 0 | 4 |
| 13 | 0 | 1 | 0 | 1 | 5 |
| 14 | 0 | 1 | 1 | 0 | 6 |
| 15 | 0 | 1 | 1 | 1 | 7 |

Fig. 8C — A2 inverted

| in(dec) | A3 | A2 | A1 | A0 | out(dec) |
|---|---|---|---|---|---|
| 0 | 0 | 1 | 0 | 0 | 4 |
| 1 | 0 | 1 | 0 | 1 | 5 |
| 2 | 0 | 1 | 1 | 0 | 6 |
| 3 | 0 | 1 | 1 | 1 | 7 |
| 4 | 0 | 0 | 0 | 0 | 0 |
| 5 | 0 | 0 | 0 | 1 | 1 |
| 6 | 0 | 0 | 1 | 0 | 2 |
| 7 | 0 | 0 | 1 | 1 | 3 |
| 8 | 1 | 1 | 0 | 0 | 12 |
| 9 | 1 | 1 | 0 | 1 | 13 |
| 10 | 1 | 1 | 1 | 0 | 14 |
| 11 | 1 | 1 | 1 | 1 | 15 |
| 12 | 1 | 0 | 0 | 0 | 8 |
| 13 | 1 | 0 | 0 | 1 | 9 |
| 14 | 1 | 0 | 1 | 0 | 10 |
| 15 | 1 | 0 | 1 | 1 | 11 |

Fig. 9A

| index | # of entries available | set 0 | | set 1 | | set 2 | | set 3 | |
|---|---|---|---|---|---|---|---|---|---|
| 0 | 4 | 0 | | 0 | | 0 | | 0 | |
| 1 | 4 | 1 | | 1 | | 1 | | 1 | |
| 2 | 4 | 2 | | 2 | | 2 | | 2 | |
| 3 | 1 | 3 | X | 3 | | 3 | X | 3 | X |
| 4 | 4 | 4 | | 4 | | 4 | | 4 | |
| 5 | 4 | 5 | | 5 | | 5 | | 5 | |
| 6 | 4 | 6 | | 6 | | 6 | | 6 | |
| 7 | 4 | 7 | | 7 | | 7 | | 7 | |
| 8 | 3 | 8 | X | 8 | | 8 | | 8 | |
| 9 | 4 | 9 | | 9 | | 9 | | 9 | |
| 10 | 4 | 10 | | 10 | | 10 | | 10 | |
| 11 | 4 | 11 | | 11 | | 11 | | 11 | |
| 12 | 4 | 12 | | 12 | | 12 | | 12 | |
| 13 | 4 | 13 | | 13 | | 13 | | 13 | |
| 14 | 4 | 14 | | 14 | | 14 | | 14 | |
| 15 | 4 | 15 | | 15 | | 15 | | 15 | |

Before

Fig. 9B

| index | # of entries available | set 0 | | set 1 | | set 2 (invert A2) | | set 3 (invert A3) | |
|---|---|---|---|---|---|---|---|---|---|
| 0 | 4 | 0 | | 0 | | 4 | | 8 | |
| 1 | 4 | 1 | | 1 | | 5 | | 9 | |
| 2 | 4 | 2 | | 2 | | 6 | | 10 | |
| 3 | 3 | 3 | X | 3 | | 7 | X | 11 | X |
| 4 | 4 | 4 | | 4 | | 0 | | 12 | |
| 5 | 4 | 5 | | 5 | | 1 | | 13 | |
| 6 | 4 | 6 | | 6 | | 2 | | 14 | |
| 7 | 3 | 7 | | 7 | | 3 | | 15 | |
| 8 | 3 | 8 | X | 8 | | 12 | | 0 | |
| 9 | 4 | 9 | | 9 | | 13 | | 1 | |
| 10 | 4 | 10 | | 10 | | 14 | | 2 | |
| 11 | 3 | 11 | | 11 | | 15 | | 3 | |
| 12 | 4 | 12 | | 12 | | 8 | | 4 | |
| 13 | 4 | 13 | | 13 | | 9 | | 5 | |
| 14 | 4 | 14 | | 14 | | 10 | | 6 | |
| 15 | 4 | 15 | | 15 | | 11 | | 7 | |

After

SYSTEMS AND METHODS FOR INCREASING YIELD OF DEVICES HAVING CACHE MEMORIES BY INHIBITING USE OF DEFECTIVE CACHE ENTRIES

BACKGROUND

1. Field of the Invention

The invention relates generally to memory systems, and more particularly to systems and methods for enabling memories to operate properly despite the presence of multiple defective memory cells.

2. Related Art

Digital circuits are becoming increasingly complex. It is not unusual for one of these circuits to be made up of millions of transistors. As digital circuits become more complex, they typically have greater capabilities, but there is also a greater chance that one or more of the components of the circuits will not operate properly. In some instances, even a single incorrect bit can cause a malfunction that will render an entire circuit useless. This may be particularly true of expensive digital circuits, such as advanced microprocessors. It is therefore very important to minimize the number of defects that arise in the manufacturing of digital circuits.

Even though a great deal of effort goes into minimizing the number of defects that are present in digital circuits, it is virtually impossible to eliminate all defects. Consequently it is important, not only to minimize the number of defects that arise during manufacturing processes, but also to take advantage of mechanisms that allow digital circuits to operate properly even in the presence of these defects.

Memory systems provide one example of systems that can be designed to operate normally despite having one or more defective memory cells. A memory array includes a large number of identical memory cells, each of which can store a single bit of data. A set of these memory cells can store a block of data (e.g., an eight-bit byte or a 32-bit word) that has a unique address within the memory array. If a single memory cell in the array is defective, data that is stored at an address in the array which includes the defective cell may be corrupted, and a program using this data may produce erroneous results. Because the memory cells are functionally identical, however, a mechanism may be provided to substitute properly operating memory cells for the defective memory cells.

Conventionally, this memory replacement is achieved using a line-replacement redundancy mechanism in which a defective row or column of memory cells is replaced functionally by a redundant row or column that is provided in the memory array. In some systems, there is a single redundant row or column, although in more recent systems there may be several. If it is determined that a particular row or column of the memory array is defective, a memory management circuit coupled to the memory array is configured to access the redundant row or column in place of the defective row or column. Put another way, an address translation is effectively performed for a single row/column of the memory array, so that when there is an attempt to access the defective row/column, this access is redirected to the redundant row/column.

While a conventional line-replacement redundancy mechanism may be effective to enable use of a memory array despite a small number of defects, this mechanism has some shortcomings. For instance, typically, only one or a few replacement rows/columns are available to replace defective rows/columns. Providing additional replacement rows/columns can be prohibitively expensive, especially in the case of cache memory that is constructed on the same chip as a processor. As the size of cache memories increase, the potential for defective memory cells increases as well, but it is difficult to scale up the line replacement mechanism to meet the increased potential for defects.

It would therefore be desirable to provide improved systems and methods to enable memory systems, and particularly cache memories, to operate properly despite an increasing number of potentially defective memory cells, thereby increasing the yield of corresponding devices.

SUMMARY OF THE INVENTION

One or more of the problems outlined above may be solved by the various embodiments of the invention. Broadly speaking, the invention includes systems and methods for increasing the yield of devices incorporating cache memories. These systems and methods involve implementing a set-associative cache memory, where the use of cache entries that include defects is selectively avoided. In one embodiment, the cache memory is organized as an n-way set-associative cache. A cache replacement management unit determines in which of n possible entries data will be stored. The cache replacement management unit is configured to take into account whether each cache entry is defective when determining whether to select that entry as the destination entry for new data. In one embodiment, the cache replacement management unit implements a least-recently-used policy in selecting the cache entry in which the new data will be stored. The cache replacement management unit treats any defective entries as if they hold the most recently used data, and thereby avoids selecting defective entries as the destination for new data. In one embodiment, the cache performs index translation before indexing into each set of cache entries in order to effectively redistribute defective entries among the indices.

One embodiment comprises an n-way set-associative cache having a replacement management unit configured to select one of the cache entries in which to store data. The replacement management unit is configured to identify defective cache entries and to inhibit selection of any of the defective cache entries. The defective state of the entries may be determined by state information associated with each of the entries. In one embodiment, the replacement management unit is configured to implement a least-recently-used policy and to identify defective entries as being the most recently used entries. In one embodiment, the cache is constructed on the same integrated circuit chip as a processor that uses the cache. In one embodiment, the cache includes circuitry configured to translate an index prior to selecting corresponding entries in the different sets of cache entries. The index translation circuitry may perform different index translations for the different sets of cache entries, or may perform no translation for some sets of cache entries.

Another embodiment comprises a method implemented in a cache, including receiving a cache write request, indexing to a cache entry in each of n sets of cache entries, and selecting one of the indexed cache entries in which to store data associated with the cache write request, where selection of defective cache entries is inhibited. The defective cache entries may be identified based upon state information that is associated with the entries. The selection of the cache entry in which to write the data may follow a least-recently-used policy. In this case, defective cache entries are identified as being the most recently used in order to inhibit their selection. In one embodiment, the index value may be translated before being used to index into one or more of the different sets of cache entries.

Yet another embodiment comprises a replacement management unit for use in conjunction with a set-associative cache. The replacement management unit is configured to identify defective cache entries (e.g., using state information associated with each entry) and to inhibit selection of any of the defective cache entries. The replacement management unit may, for example, implement a least-recently-used policy and identify defective entries as being the most recently used entries in order to inhibit their selection. The replacement management unit may include index translation circuitry configured to selectively perform different index translations for the different sets of cache entries.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for implementing a set-associative cache memory, wherein the use of cache entries that include defects is selectively avoided.

In one embodiment, a processor is constructed with a cache memory (also referred to herein simply as a cache) on the same integrated circuit chip as the processor. The cache memory is used to store data that is likely to be used in the near future by the processor (e.g., data that has recently been accessed, or data that is prefetched.) The data that is stored in the cache memory can be accessed more quickly by the processor than data which is stored in a main memory, thereby increasing the efficiency of the processor. Because the cache memory may include one or more entries that are defective (failed), a mechanism is implemented to prevent use of the defective entries, while allowing use of the other entries.

In one embodiment, the cache memory is organized in a set-associative manner. In other words, the cache entries are grouped into sets, where each entry in a particular set is associated with a corresponding entry from each of the other sets. Each piece of data that may be stored in the cache can then be stored in one of several entries in the cache (one from each set.) A cache replacement management unit (replacement manager) determines in which of the possible entries the data will actually be stored. In this embodiment, the cache replacement management unit is configured to take into account whether each cache entry is defective when determining whether to select that entry as the destination entry for new data.

In one embodiment, the cache replacement management unit implements a least-recently-used policy in selecting the cache entry in which the new data will be stored. Under this policy, the cache replacement management unit which of the potential destination entries holds the data that was least recently used, and selects this entry as the destination in which the new data will be stored. In determining which of the entries holds the least recently used data, the cache replacement management unit treats any defective entries as if they hold the most recently used data. In this manner, the cache replacement management unit avoids selecting the defective entries in which to store the new data (since the defective entries will never be determined to hold the least recently used data.)

In one embodiment, an address translation mechanism is implemented in the cache. The address translation mechanism is separately applied, if necessary, to each of the sets of cache entries. If the group of cache entries in which a piece of data could potentially be stored includes more than a single defective entry, the address translation mechanism can be applied to one or more sets of cache entries to effectively "shuffle" the entries. This is intended to redistribute the defective entries, so that the group which previously included multiple defective entries will include less defective entries (e.g., one.) By reducing the number of defective entries in a single group, there is a reduced risk of useful data being discarded from the cache in order to make room for newly stored data, and a corresponding increase in cache performance.

Figure 1:
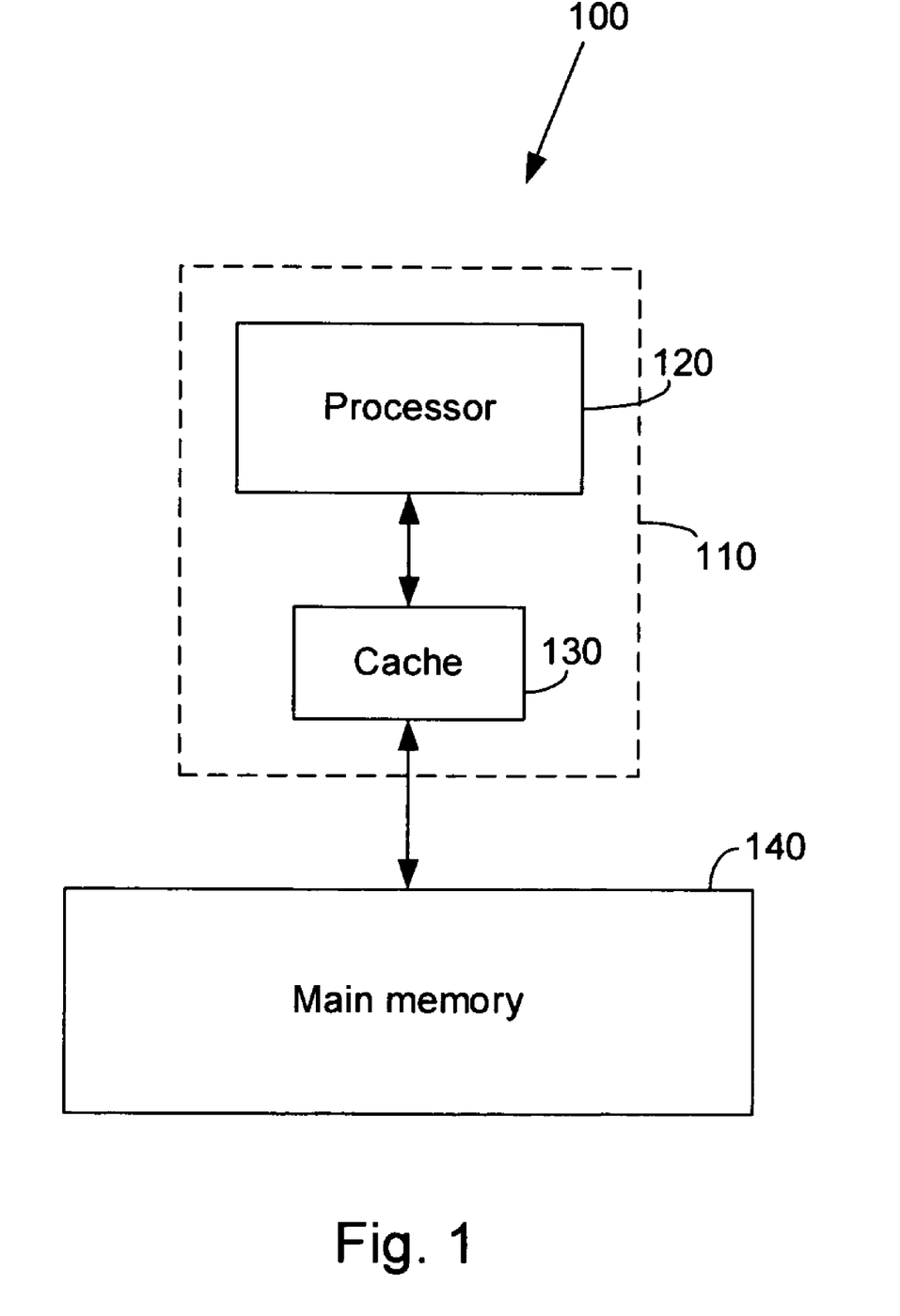
FIG. 1 is a functional block diagram illustrating the relationship between a processor, a cache memory and a main memory in accordance with one embodiment.

The present disclosure will focus primarily on an embodiment in which a cache memory is integrated into a processor chip. This is illustrated schematically in FIG. 1. FIG. 1 is a functional block diagram illustrating the relationship between a processor 120, a cache memory 130 and a main memory 140. Processor 120 and cache memory 130 are constructed on the same integrated circuit chip, 110. Cache memory 130 and main memory 140 form a hierarchical memory system for storing data that will be used by processor 120.

Typically, when data is needed by processor 120, this data is requested from the memory system. Upon receiving the data request, the memory system first determines whether the data is stored in cache memory 130 because this memory is closer to the processor and data stored in it can be retrieved more quickly than from main memory 140. If the data is stored in cache memory 130, the data is retrieved from cache memory 130 and returned to processor 120. If cache memory 130 does not hold the data, the request is forwarded to main memory 140, from which it is retrieved and returned to the processor. Typically, the data retrieved from main memory 140 is stored in cache memory 130 when it is returned to processor 120.

A cache memory can be organized in various ways. For example, in one simple type of cache, addresses in the main memory are mapped to a unique address in the cache. In other words, data stored at a particular address in the main memory can only be stored in a single, corresponding location (entry) in the cache. This configuration can have several shortcomings. For instance, because the cache memory is smaller than the main memory, many different addresses in the main memory will be mapped to a single location in the cache. As a result, whenever data from one of these addresses in the main memory is used by the processor, the data corresponding to one of these other addresses that may have been stored in the cache will be driven out by the more recently used data, and will no longer be available in cache for use by the processor. Further, if one of the entries in the cache memory is defective, there is no place in the cache to store data from the corresponding addresses in the main memory, unless a conventional line replacement mechanism is implemented.

The present embodiment uses a different type of cache organization, and is referred to as a set-associative cache. In a set-associative cache, the cache entries are organized in multiple sets. Each entry in one of the sets is associated with a corresponding entry in each of the other sets. For example, in a four-way set-associative cache, the cache entries are organized into four sets, and for each entry in the first set there is a corresponding entry in the second set, a corresponding entry in the third set, and a corresponding entry in the fourth set. Then, each address in the main memory is mapped to one of these groups of cache entries, rather than to a single cache entry.

A set-associative cache may have several advantages over the simple cache described above. For example, if data from a first address in the main memory is stored to a particular group of cache entries, data from a second address in the main memory can also be stored in that same group of cache entries without necessarily driving out the data from the first address. If it is necessary to overwrite data in one of the cache entries in the group, the cache will make a determination as to which data stored in the group of entries is least useful (based on some predetermined algorithm, as will be explained more detail below,) and will overwrite the least useful information. Another advantage is that, even when one of the cache entries in the group is defective, there are still other entries in which corresponding data from the main memory can be stored.

Figure 2:
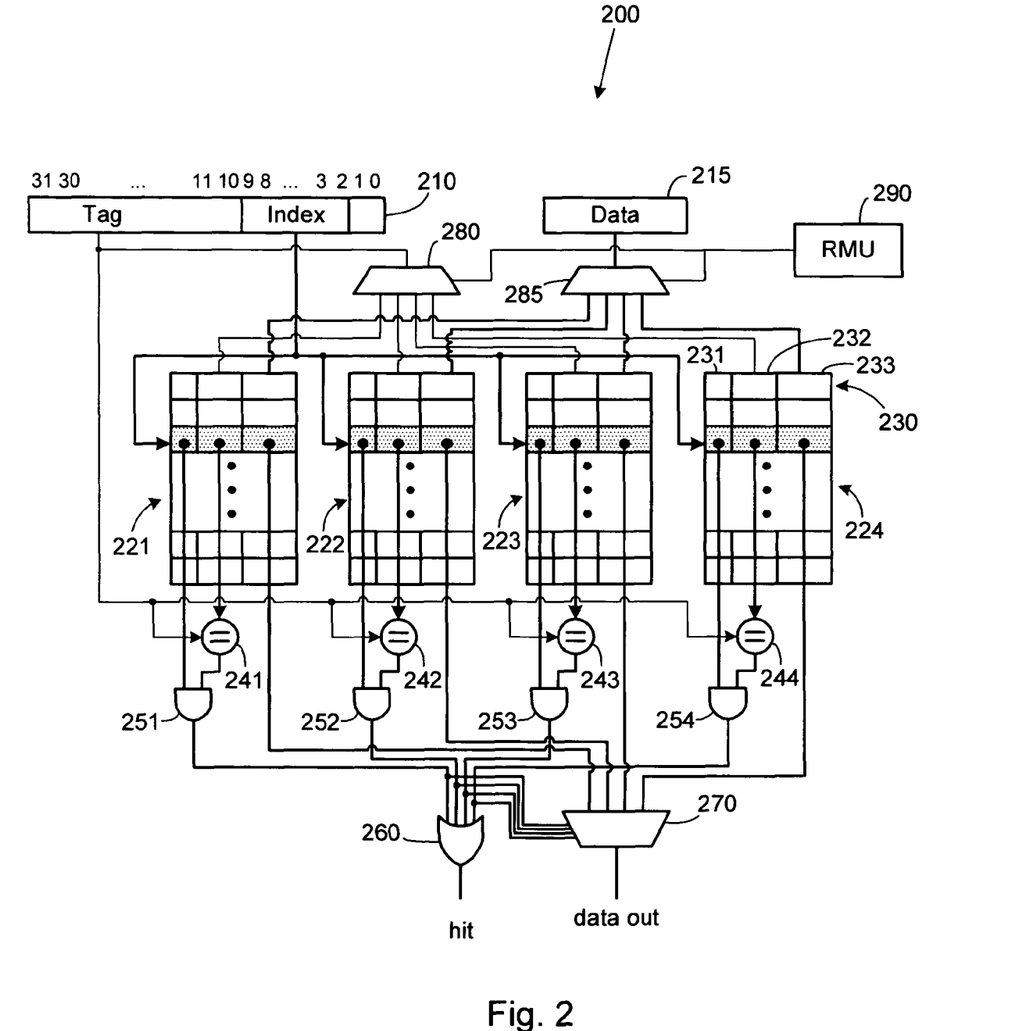
FIG. 2 is a diagram illustrating the structure of a set-associative cache in accordance with one embodiment.

Referring to FIG. 2, a diagram illustrating the structure of a set-associative cache in accordance with one embodiment is shown. Cache 200 is a four-way set-associative cache. The cache entries are organized into four sets, 221-224. Each set has 256 cache entries (e.g., 230.) Each cache entry has three parts: a control field (e.g., 231); a tag (e.g., 232); and data (e.g., 233).

In this embodiment, the control field of each entry is used to identify a state associated with the entry. Conventionally, each entry might have one of three possible states: invalid; exclusive; or shared. The present embodiment also provides for a fourth state: failed. This will be explained in more detail below. The data stored in each entry is actually a copy of data that is already stored, or is in the process of being stored, at a particular location in the main memory. Accordingly, the "address of the data," as used herein, refers to the address in the main memory at which the data is or will be stored. The tag in each entry consists of a portion of the address of the data stored in the entry. As depicted in FIG. 2, the tag consists of bits 10:31 of the address.

Each of the sets of cache entries is coupled to receive an address 210. Address 210 is a data address that is being accessed by the processor. A first set of bits of address 210 (bits 10:31) are used as a tag. During a write operation, this tag is stored in a selected one of the cache entries. During a read operation, this tag is used for comparison purposes to determine whether the data to be read is stored in one of the cache entries. A second set of bits of address 210 are used as an index into each set of cache entries (221-224.) Because each set includes 256 cache entries, eight bits (bits 2:9) are needed to index into the sets of entries. The last two bits of address 210 (bits 0:1) are not used by the cache system. By using bits 2:9 instead of bits 0:7 for the index, the index refers to 4-byte blocks of data, rather than single-bytes of data.

Each set of cache entries (221-224) is coupled to a corresponding comparator (241-244) and a corresponding AND gate (251-254.) Each of comparators 241-244 is coupled to receive the tag portion of address 210. Each comparator 241-244 is also coupled to receive the tag portion of a selected entry in the corresponding set of cache entries 221-224. During a read operation, the comparator compares the two tags and asserts an output signal if the tags match. This output signal is provided as an input to the corresponding AND gate (e.g., the output of comparator 241 is provided as an input to AND gate 251.) The AND gate (e.g., 251) is also coupled to receive a signal corresponding to the control field of the selected entry in the corresponding set of entries (e.g., 221.) If the selected entry is valid, this signal will be asserted. The output of the AND gate is therefore asserted if the selected entry in the corresponding set is valid and the tag stored in this entry matches the tag portion of address 210.

The output of each of AND gates 251-254 is provided as an input to OR gate 260. If any of the signals received from AND gates 251-254 is asserted, the output of OR gate 260 is asserted as well, indicating that the cache access was a hit (i.e., the data that was the target of the access was found in the cache.) If none of the signals received from AND gates 251-254 is asserted, the output of OR gate 260 is not asserted, indicating that the cache access was a miss (i.e., the data that was the target of the access was not found in the cache.)

The output of each of AND gates 251-254 is also provided as a control input to multiplexer 270. In addition to the control signals received from AND gates 251-254, multiplexer 270 also receives data signals from each of the sets of cache entries (221-224.) More specifically, the data stored in the indexed entry in each set is provided as an input to multiplexer 270. If the output of the AND gate corresponding to a particular set of entries is asserted, this signal will cause multiplexer 270 to select the data signal from the indexed entry of the same set. This data signal will be provided at the output of multiplexer 270.

Figure 3:
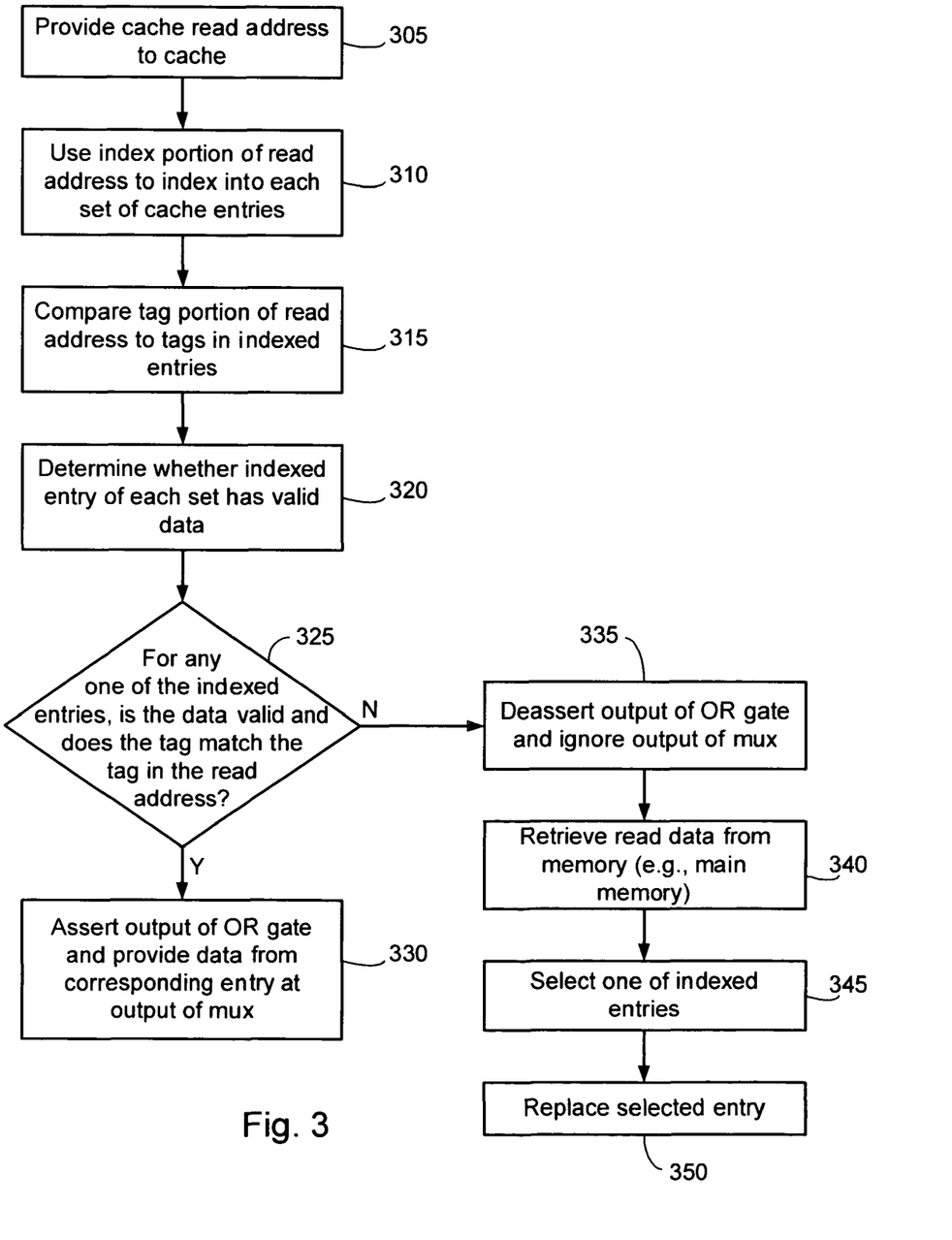
FIG. 3 is a flow diagram summarizing the process of a read operation in the cache of FIG. 2.

Referring to FIG. 3, a flow diagram summarizing the process of a read operation in the cache of FIG. 2 is shown. As depicted in the figure, address 210 is first supplied to the cache (block 305.) A portion of the address 210 (i.e., bits 2:9) is then used to index into each of the sets of cache entries (block 310.) Then, a tag portion of address 210 (i.e., bits 10:31) is compared to the tag stored in the indexed entry in each of the sets of cache entries (block 315.) It is also determined whether the indexed entry in each of the sets of cache entries is valid (block 320.) It should be noted that the tag comparisons and the determination as to whether the entries are valid actually occur in parallel in the embodiment of FIG. 2. If one of the indexed entries is both valid and includes a tag that matches address 210 (block 325,) the output of OR gate 260 is asserted and the data stored in this entry is provided at the output of multiplexer 270 (block 330.)

If none of the indexed entries is both valid and has a matching tag, then the output of OR gate 260 is deasserted and the output of multiplexer 270 is ignored (block 335.) Because the requested data was not found in the cache, the data will be retrieved from memory (block 340.) In order to make the data available (at least temporarily) for subsequent accesses, the data is also stored in the cache. The method of FIG. 3 therefore includes selecting one of the indexed entries (block 445) and writing the data to the selected entry (block 450.) More specifically, the control field of the entry is set to indicate the state of the entry, the tag portion of the write address is stored in the tag portion of the entry, and the write data is stored in the data portion of the entry.

Figure 4:
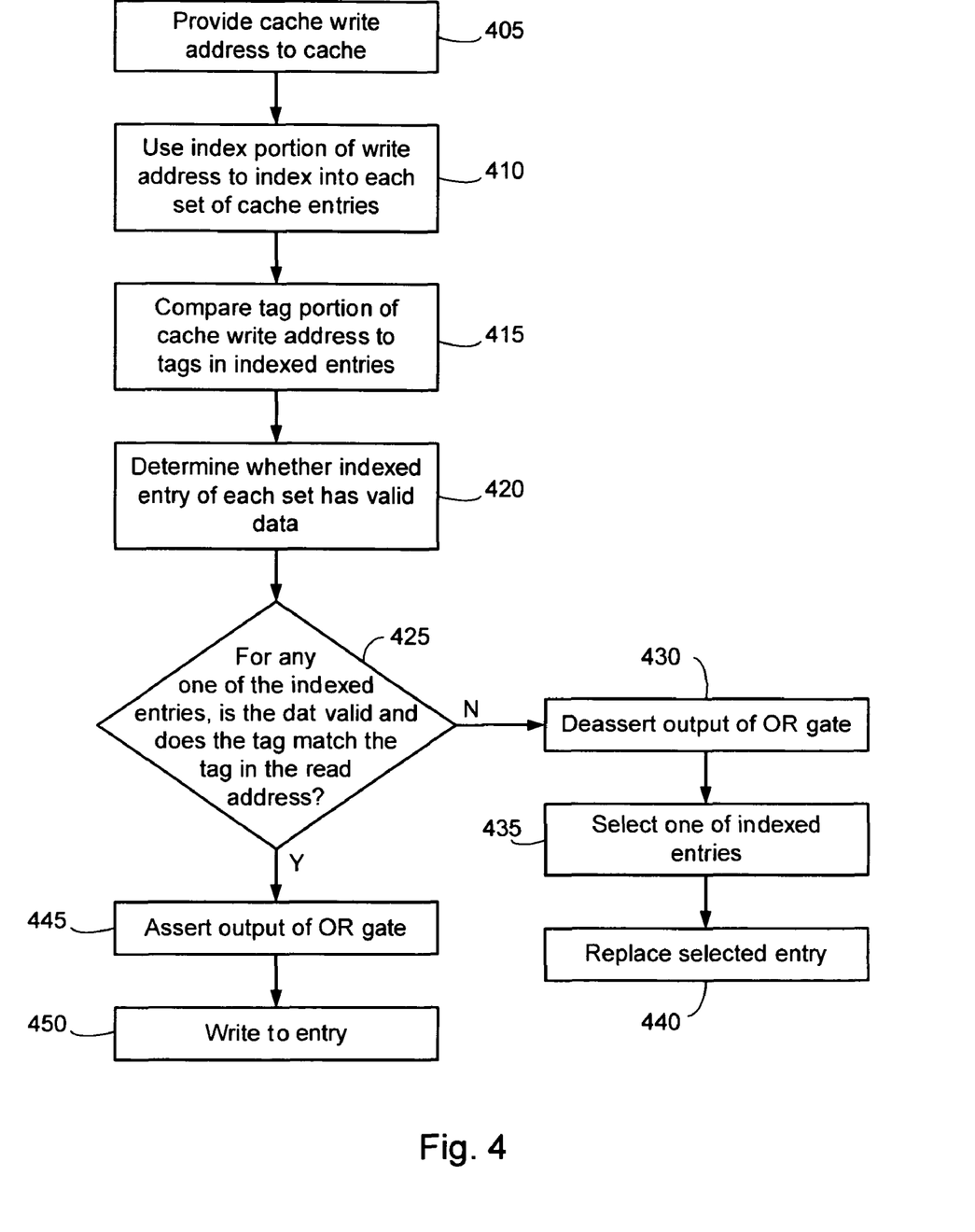
FIG. 4 is a flow diagram summarizing the process of a write operation in the cache of FIG. 2.

Referring to FIG. 4, a flow diagram summarizing the process of a write operation in the cache of FIG. 2 is shown. As depicted in the figure, The process again begins with address 210 first being supplied to the cache (block 405.) In this instance, however, the address is a write address. A portion of address 210 (bits 2:9) is used to index into each of the sets of cache entries (block 410.) Next, a tag portion of address 210 (bits 10:31) is compared to the tag stored in the indexed entry in each of the sets of cache entries (block 415,) and it is determined whether the indexed entry in each of the sets of cache entries is valid (block 420.) Again, the tag comparisons and the validity determination occur in parallel in this embodiment. If one of the indexed entries is both valid and includes a tag that matches address 210 (block 425,) the output of OR gate 260 is asserted (block 445,) indicating that data corresponding to the write address is already stored in the cache. The data is therefore written to this same cache entry (block 450.)

If it is determined that none of the indexed entries is both valid and has a matching tag, then the output of OR gate 260 is deasserted (block 430,) indicating that valid data corresponding to the write address is not present in the cache. The cache therefore selects one of the indexed entries (block 435) and writes the data to the selected entry (block 440,) including setting the control field of the entry to indicate the state of the entry, storing the tag portion of the write address in the tag portion of the entry, and storing the write data in the data portion of the entry. It should be noted that, if none of the indexed cache entries already stores data associated with the write address, the data for the write operation can potentially be stored in any one of the indexed entries. It is therefore necessary to select one of the entries in which to store the data. The selection of one of the cache entries is performed in the same manner as when data retrieved from memory on a read miss is stored in the cache.

As pointed out above, data is stored in the cache when either a read miss or a write miss occurs. When there is a cache miss, none of the indexed cache entries already stores data associated with the cache access address, so the data for the cache access can potentially be stored in any one of the indexed entries. It is therefore necessary to determine in which of these entries the data actually be stored. In one embodiment, this task is handled by a replacement management unit. Referring again to FIG. 2, replacement management unit 290 generates control signals that are provided to multiplexers 280 and 285. Multiplexer 280 receives the tag portion of address 210 and has outputs that are coupled to each of the sets of cache entries. Similarly, multiplexer 285 receives the data 215 and has outputs that are coupled to each of the sets of cache entries. Based upon the control signals received from replacement management unit 290, multiplexers 280 and 285 provide the tag and data, respectively, to the selected one of the indexed cache entries.

It should be noted that alternative embodiments could implement the same functionality using different structures. For example, rather than selectively providing the tag and data to only one of the indexed cache entries, this information could be provided to all of the indexed cache entries, and a write signal could be selectively provided to one of the indexed entries so that the tag and data would be stored in only the entry that receives the write signal. Other variations are possible as well.

Replacement management unit 290 may be configured to select one of the indexed cache entries in a variety of ways. In one embodiment, the replacement management unit is configured to implement a least-recently-used policy in selecting one of the indexed cache entries. Under this policy, the replacement management unit will select the cache entry which stores the data that was least recently used by the processor. The theory underlying this policy is that the more recently used data is more likely to be needed by the processor, so the efficiency of the processor will be maximized if the new data that is being stored in cache drives out the least recently used (hence least likely to be needed) data.

Replacement management units in conventional cache systems widely implement some form of least-recently-used policy. In some cases, implementation of this policy involves tracking the use of the data stored in each cache entry and identifying the rank of each cache entry according to how recently it was used. For example, when the data in a particular cache entry is used, the entry may be assigned a rank of "1". Whenever a cache entry in the same index in one of the other sets is used, the rank may be incremented. Thus, the cache entry having the most recently used data will have a rank of "1", the entry having the second most recently used data will have a rank of "2", the entry having the third most recently used data will have a rank of "3", and the entry having the least recently used data will have a rank of "4". Then, whenever it is necessary to determine in which of the cache entries to store new data, the entry having the rank of "4" will be selected.

Conventionally, the replacement management unit does not address the issue of defective cache entries. This issue is instead addressed by a conventional mechanism such as the line replacement mechanism described above. It is therefore conventionally assumed by the cache system that none of the cache entries are defective. In the embodiments of the present invention, however, it is assumed that some of the cache entries may be defective, so it is necessary to provide a mechanism for avoiding the use of these defective entries.

In one embodiment, this mechanism is implemented by the replacement management unit in conjunction with the implementation of the least-recently-used replacement policy. In this embodiment, defective cache entries are identified and are assigned a rank that is higher than that of the entry having the least recently used data. For example, defective cache entries might be assigned a rank of "1", or even "0". The replacement management unit could then select one of the indexed cache entries in which to store the new data in exactly the same manner as above (i.e., by selecting the entry having the greatest numeric rank.)

In one embodiment, the ranking of the cache entries based upon how recently each of the entries was used is performed by a set of LRU (least-recently-used) decision circuits. In this embodiment, one LRU decision circuit is provided for each index. Thus, in the exemplary cache of FIG. 2, there would be 256 LRU decision circuits. Each of these circuits would be configured to consider the four cache entries at the corresponding index (one from each of sets 221-224) and to determine which of these entries is the least recently used. Each LRU decision circuit is configured to determine, based upon state information stored with each entry, whether any of the corresponding four entries is defective. If the state information indicates that a particular entry is defective, then the entry is treated as if it holds the most recently used data.

In one embodiment, the state information indicating whether or not a particular cache entry is defective is stored in the control field of the entry (e.g., item 231 in FIG. 2.) In this embodiment, the cache is a write-back cache used by a single processor in a multiprocessor system and implements a write-invalidate cache coherence protocol. The control field for each entry is used to identify the state of the entry, which may be any of the following: invalid; exclusive (valid for read/write); shared (valid for read only); and failed. These states, and the transitions between the states, are illustrated in FIGS. 5A and 5B.

Figure 5A:
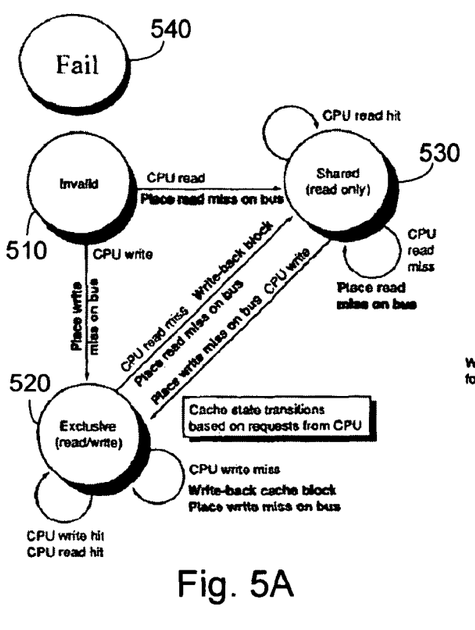
FIGS. 5A and 5B are a pair of state diagrams illustrating the possible cache entry states and transitions between these states in accordance with one embodiment.
Figure 5B:
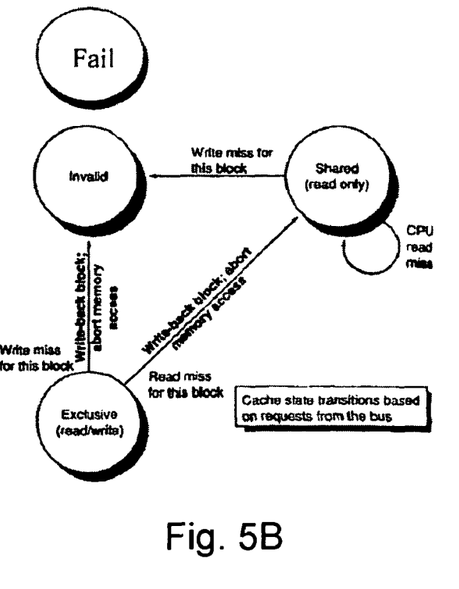

Referring to FIGS. 5A and 5B, a pair of state diagrams illustrating the possible cache entry states and transitions between these states in accordance with one embodiment are shown. FIG. 5A shows the cache entry states with transitions that are based on requests from the processor, while FIG. 5B shows the states with transitions that are based on requests from a processor bus. If a cache entry does not store valid data (e.g., at power-up, before any data has been stored in the entry,) the control field of the entry indicates that the state of the entry is invalid (510.) When data is stored in the entry, the entry is valid and the state of the entry may be either exclusive (520) or shared (530.) If this cache is the only one that stores the data in this cache entry, the state will be exclusive (520,) and the data will be valid for both read and write operations to the cache entry. If the same data is stored in other caches as well, the state will be shared (530,) and data can be validly read from the cache entry, but not written (because the data must be updated and the other caches as well.)

The invalid (510,) exclusive (520) and shared (530) states are commonly used in conventional cache systems. The transitions between these states are well known and understood, so they will not be described in detail here, but are simply shown in the figures. The present cache system differs from conventional systems, however, in that the cache entries may also be in a failed state (540.) If an entry in the cache is determined to be defective (e.g., if any one of the bits of the entry in the entry is defective,) the state of the entry is failed. The defective nature of the entry may be determined in a variety of ways, and the state of the entry may be set to "failed" at an appropriate time. Accordingly, no transitions to the failed state are shown in FIGS. 5A and 5B. For example, the cache may be scanned for defects as part of the manufacturing process, and the boot-up procedures for the system may include setting the state of defective cache entries to the failed state. Once the cache entry is identified as failed, the entry should not be used, so no transition is shown in the figures from the failed state to any of the other states.

The present mechanism allows a cache memory to be used despite multiple defects that may arise in the manufacturing of the memory. In fact, this mechanism can potentially allow a cache memory having many defects to be used effectively. For example, if one entry for each index in the cache (i.e., one quarter of the cache) were defective, the cache could still function effectively as a 3-way (instead of 4-way) set-associative cache. Although it is highly unlikely that this many defects would occur in the cache memory, it is also highly unlikely that any defects that do occur would be distributed so as to affect only one of the entries associated with each index. It is instead likely that the defects would be distributed in such a manner that, if there is a very large number of defects, is likely that some indexes would have no defective entries, while others would have multiple defective entries.

It should be noted that, if a cache memory has a given number of failed entries, the performance of the cache will be degraded more if multiple entries corresponding to the same index are failed then if each index has no more than a single failed entry. The cache system may therefore include a mechanism to redistribute failed to cash entries among the different indexes to minimize the number of failed entries that are associated with a single index. In one embodiment, this mechanism is implemented using a set of address (index) translation circuits that can effectively shuffle the entries within a particular set.

Figure 6:
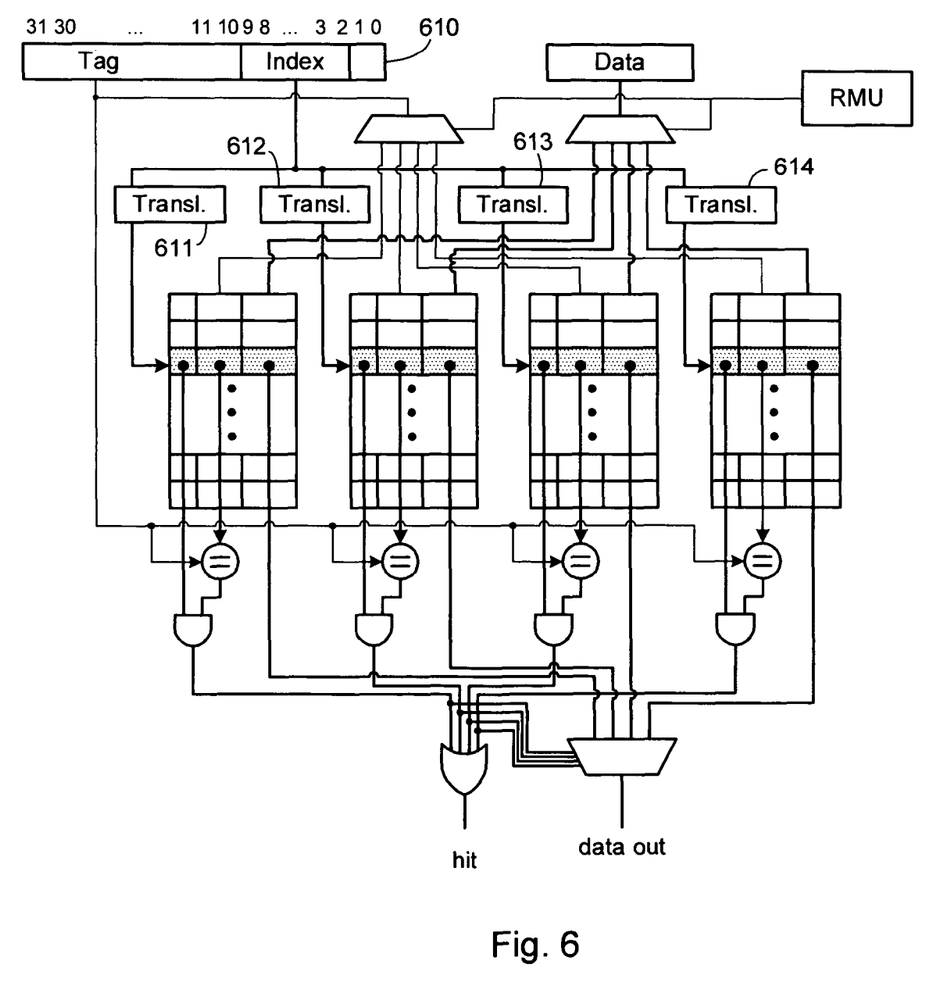
FIG. 6 is a diagram illustrating the structure of a set-associative cache having an index translation mechanism in accordance with one embodiment.

Referring to FIG. 6, a diagram illustrating the structure of a set-associative cache having an index translation mechanism in accordance with one embodiment is shown. The structure of this cache system is identical to the system of FIG. 2, except that an index translation circuit (611-614) is inserted between address 610 and each set of cache entries (621-624.) In this embodiment, each index translation circuit is configured to receive a set of control signals that cause one or more of the bits of the index value to be inverted prior to being used to index into the corresponding set of cache entries. As a result, each index will be associated with a single cache entry from each of sets 621-624, but the particular cache entry associated with each index can be changed. In one embodiment, the index is changed by inverting one or more of the bits of the index value received from address 610, and using the resulting value to index into the set of cache entries. Different bits can be inverted for each of the different sets of cache entries.

Figure 7:
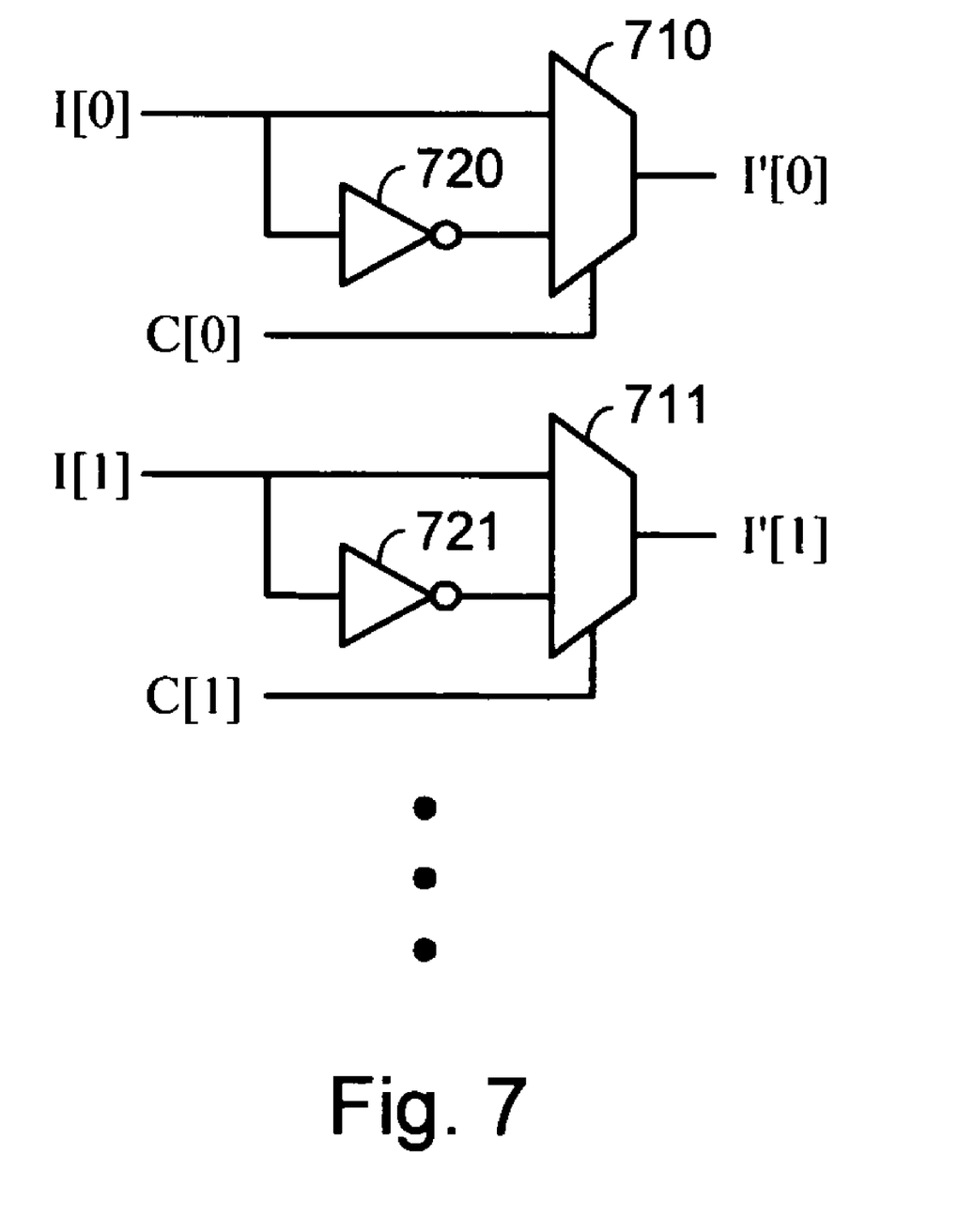
FIG. 7 is a diagram illustrating an exemplary structure of an index translation circuit in accordance with one embodiment.

Referring to FIG. 7, a diagram illustrating an exemplary structure of an index translation circuit in accordance with one embodiment is shown. In this embodiment, index translation circuit 700 is configured to selectively invert the bits of an n-bit address. In the cache system of FIG. 6, the index is 8 bits long (so that the 256, or $2^8$, cache entries can be addressed.) In an example that will be provided below, a 4-bit index will be used.

The bits of the index I[0:7] are provided to the index translation circuit in parallel. Each bit is handled by what can be considered a separate channel for that bit. While the index translation circuit may be configured to handle n bits, only two channels, which process bits I[0] and I[1] are explicitly shown in the figure for purposes of clarity. Each input bit (e.g., I[0] or I[1]) is input to a corresponding 2:1 multiplexer (e.g., 710 or 711, respectively.) Each bit is also provided to an inverter (e.g., 720 or 721,) the output of which is provided as a second input to the corresponding multiplexer. A control signal (e.g., C[0] or C[1]) is provided to the respective multiplexer to select either the input bit or the inverted input bit to be provided at the output of the multiplexer as a translated bit (e.g., I'[0] or I'[1].) The translated index bits are then used to index into the respective sets of cache entries.

Figure 8A:
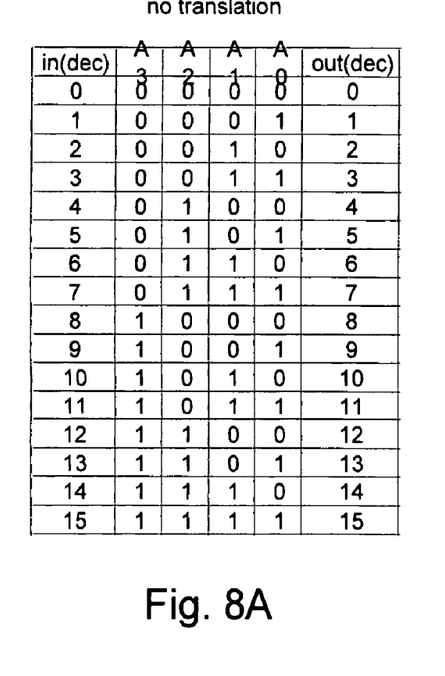
FIGS. 8A-8C are a set of tables illustrating some of the index translations that are possible using the system of FIG. 7.
Figure 8B:
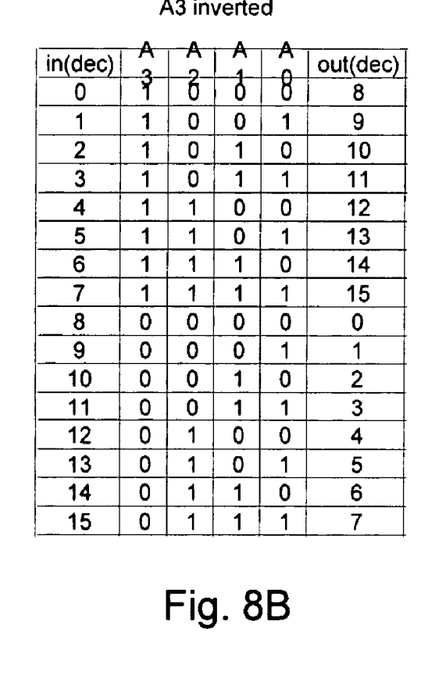
Figure 8C:
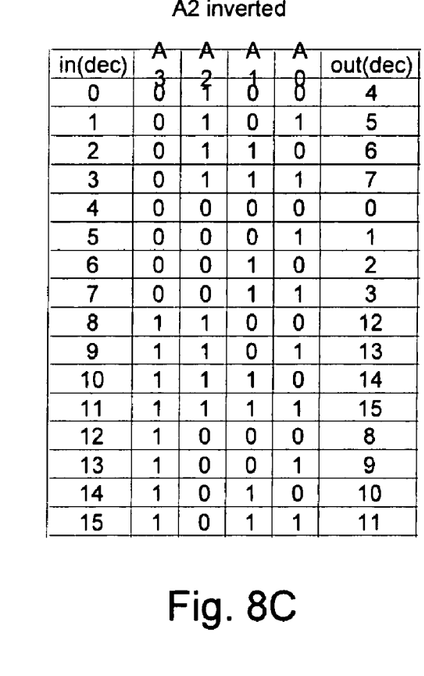

Referring to FIGS. 8A-8C, a set of tables illustrating some of the index translations that are possible using the system of FIG. 7 are shown. FIG. 8A provides an example in which there is no translation of the index. FIG. 8B shows an example in which the index is translated by inverting bit A3. FIG. 8C shows an example in which the index is translated by inverting bit A2. Each of the tables in FIGS. 8A-8C includes six columns. The first column contains the input index in decimal form. The last column contains the output (translated) index in decimal form. The second through fifth columns contain the bits of the translated index.

Referring to FIG. 8A, in which there is no translation of the index, it can be seen that bits A3-A0 remain unchanged. Input indices 0-15 therefore produce output indices 0-15, respectively. For example, input index 1 (binary 0001) results in output index 1 (binary 0001), input index 2 (binary 0010) results in output index 2 (binary 0010), and so on.

Referring to FIG. 8B, the index is translated by inverting bit A3. As a result, input indices 0-7 produce output indices 8-15, respectively, and input indices 8-15 produce output indices 0-7, respectively. For example, input index 1 (binary 0001) results in output index 9 (binary 1001), and input index 10 (binary 1010) results in output index 2 (binary 0010).

Referring to FIG. 8C, the index is translated by inverting bit A2. As a result, input indices 0-3 produce output indices 4-7, respectively, input indices 4-7 produce output indices 0-3, respectively, input indices 8-11 produce output indices 12-15, respectively, and input indices 12-15 produce output indices 8-11, respectively. For example, input index 1 (binary 0001) results in output index 5 (binary 0101), and input index 10 (binary 1010) results in output index 14 (binary 1110).

It should be noted that, as implemented in the cache system of FIG. 6, each set of cache entries has a separate index translation circuit, so the specific index translation that is applied to the index may be different for each of the sense of entries. For example, there may be no index translation for the first set of cache entries, a first index translation for the second set of cache entries, and a different index translation for the third set of cache entries. It should also be noted that, because the index translation is used here to avoid having too many failed entries associated with the same (untranslated) index, one of the sets of cache entries may need not have an index translation circuit.

Figure 9A:
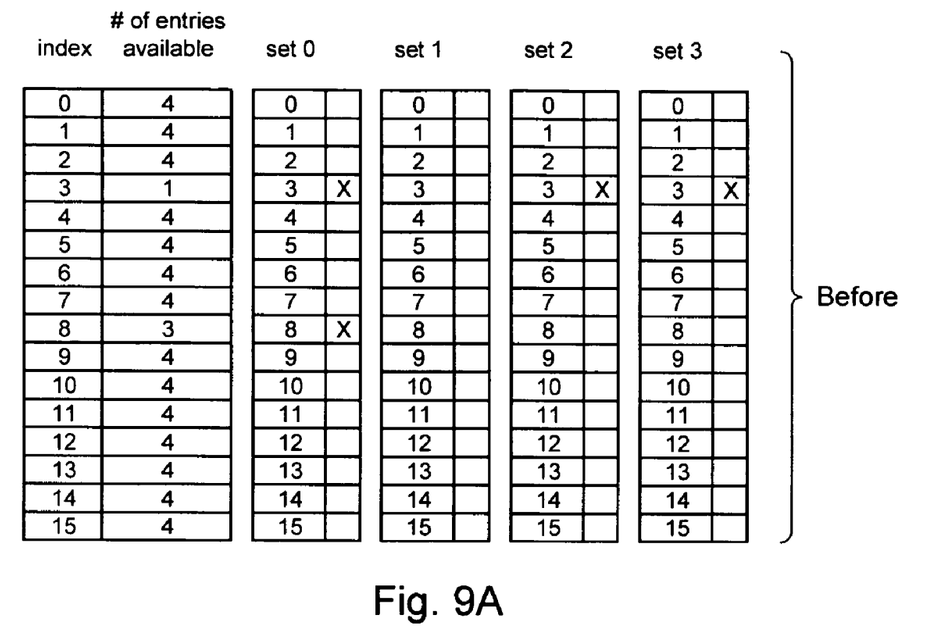
FIGS. 9A-9B are a set of tables illustrating how index translation may be used to redistribute failed entries among the different indices.
Figure 9B:
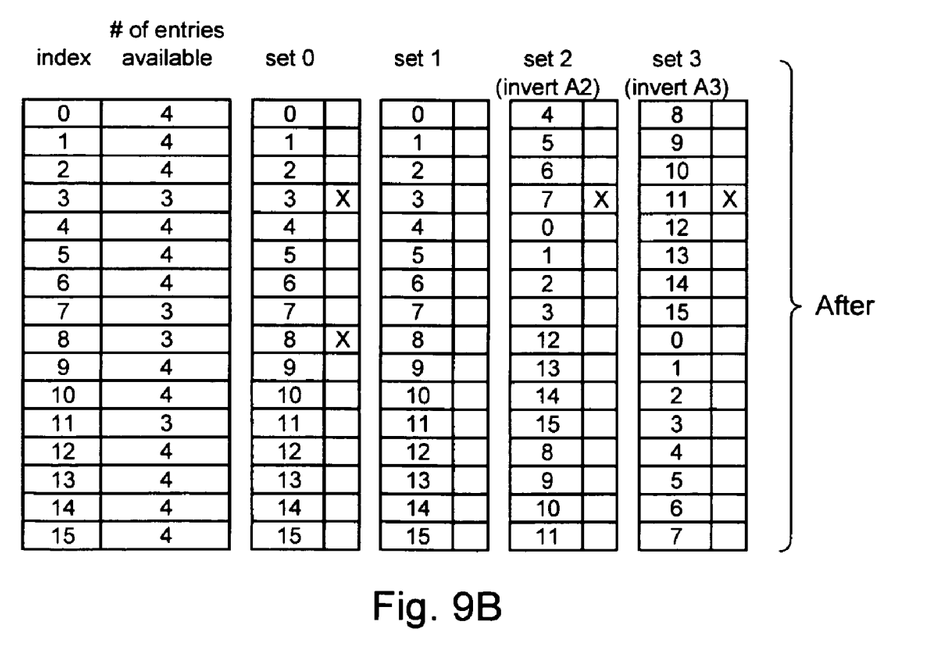

Referring now to FIGS. 9A-9B, an example is shown of a situation in which an index translation may be useful to reduce the maximum number of failed entries that are associated with any one of the untranslated indices. FIG. 9A shows the entries that are associated with each index, as well as the number of the entries that are actually available to store data, in the absence of any index translation. FIG. 9B shows the entries that are associated with each index and the corresponding numbers of available entries. The first two columns of each figure show the index (in decimal form) and the corresponding number of entries that are available to store data. Then, for each of four sets of cache entries (sets 0-3), the index associated with each cache entry and the availability of the entry to store data are shown. An "X" indicates that the corresponding cache entry is failed and is not available to store data.

FIG. 9A shows the situation before index translation is applied to any of the sets of cache entries. It can be seen that, for index 3, only one cache entry is available, as the entries having this index in sets 0, 2 and 3 are failed. Index 8 has three cache entries available to store data, and the remaining indices each have four available entries. This situation is not desirable because, each time the processor attempts to store data that has an address associated with index 3, it will have to be stored in the single available entry, even if this entry contains data that was recently used and is likely to be used again in the near future. It would be preferable to have more indices that have three entries available than to have a single index that only has one available cache entry. It is therefore desirable to apply an index translation to one or more of the sets of cache entries.

Referring to FIG. 9B, an exemplary index translation is shown, as applied to the same sets of cache entries. It can be seen that each of the sets of cache entries still has the same failed entries, but the index translation causes some of these entries to the associated with different indices. As shown in this figure, no index translation is applied to the first two sets of cache entries (set 0 and set 1). The index associated with the entries of set 2 is translated by inverting bit A2 (as shown in FIG. 8C), and the index associated with the entries of set 3 is translated by inverting bit A3 (as shown in FIG. 8B). As a result, when the index associated with the address of data to be stored in the cache is 3, the data may be stored in one of three different cache entries, including the fourth entry in set 1, the eighth entry in set 2, and the twelfth entry in set 3. The fourth entries in sets 2 and 3 are now associated with indices 7 and 11, respectively. The address translation therefore results in a situation in which there are four indices that have three available cache entries, rather than one index that has one available entry and one index that has three available entries, as was the case prior to the index translation.

As pointed out above, the described embodiments are intended to be illustrative of the invention. Numerous alternative embodiments and variations on the above embodiments are possible and will be apparent to as of ordinary skill in the art upon reading the present disclosure. For example, the embodiments described above implement a least-recently-used policy in selecting which of the available cache entries will be used to store new data. Alternative embodiments may use other policies. In these embodiments, failed cache entries can be associated with any suitable characteristic that causes the failed entries not to be selected to store the new data. For example, if the replacement policy is a least-accessed policy in which it is desirable to retain data that is accessed most often (even if not most recently) in the cache, failed entries may be identified as holding data that has been accessed more times than data in other cache entries (even though the failed entry does not actually contain any valid data).

Other variations on the described embodiments may be implemented in cache is that are organized with different members of cache entries sets. That is, rather than having four sets of cache entries, the cache may be a 2-way, 8-way or, more generally, an n-way set-associative cache, where n is greater than 1. Alternative embodiments may also be implemented in cache is that are operated in different ways than described above. For example, while the foregoing embodiments focus on a cache that is implemented in a multiprocessor system and therefore has both exclusive and shared states, alternative embodiments may be implemented in uniprocessor systems that may have only a single valid state. The caches in alternative embodiments may also be configured to hold data having different block sizes, or to store additional control or meta-data. Still other variations on the cache itself are also possible.

Those of skill in the art will understand that information and signals may be represented using any of a variety of different technologies and techniques. For example, data, instructions, commands, information, signals, bits, and symbols, that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A device comprising:
a plurality of cache entries organized as an n-way set-associative cache;
a replacement management unit configured to select a first one of the cache entries in which to replace data, wherein the replacement management unit is configured to identify defective cache entries and to inhibit selection of any of the defective cache entries as the first cache entry; and
circuitry configured to select one cache entry from each of n sets of cache entries according to an index associated with a cache access and index translation circuitry configured to translate the index prior to selecting the cache entry in one or more of the n sets of the cache entries, wherein the index translation circuitry is configured to translate the index by inverting one or more bits of the index.

2. A device comprising:
a plurality of cache entries organized as an n-way set-associative cache;
a replacement management unit configured to select a first one of the cache entries in which to replace data, wherein the replacement management unit is configured to identify defective cache entries and to inhibit selection of any of the defective cache entries as the first cache entry; and
circuitry configured to select one cache entry from each of the n sets of cache entries according to an index associated with a cache access and index translation circuitry configured to translate the index prior to selecting the cache entry in one or more of the n sets of cache entries, wherein the index translation circuitry is configured to perform different index translations of two or more of the n sets of cache entries.

3. The device of claim 2, wherein the index translation circuitry is configured to leave the index untranslated for one of the n sets of cache entries.

4. A method comprising:
providing an n-way set-associative cache;
translating an index associated with a cache access, wherein translating the index comprises inverting one or more bits of the index;
indexing to a cache entry in each of n sets of cache entries;
when the cache access to the indexed cache entries is a miss, selecting one of the indexed cache entries in which to replace data stored therein with data associated with the cache miss, wherein selection of defective cache entries is inhibited.

5. A method comprising:
providing an n-way set-associative cache;
translating an index associated with a cache access, wherein translating the index comprises performing different index translations for two or more of the n sets of cache entries;
indexing to a cache entry in each of n sets of cache entries;
when the cache access to the indexed cache entries is a miss, selecting one of the indexed cache entries in which to replace data stored therein with data associated with the cache miss, wherein selection of defective cache entries is inhibited.

6. The method of claim 5, wherein translating the index comprises leaving the index untranslated for one of the n sets of cache entries.

* * * * *